United States Patent
Phipps

(10) Patent No.: US 6,651,691 B2
(45) Date of Patent: Nov. 25, 2003

(54) UNIVERSAL MOUNTING DEVICE FOR VALVES

(75) Inventor: John Scott Phipps, 209 Bridlegate Dr., McKinney, TX (US) 75069

(73) Assignee: John Scott Phipps, McKinney, TX (US)

(*) Notice: Subject to any disclaimer, the term of this patent is extended or adjusted under 35 U.S.C. 154(b) by 105 days.

(21) Appl. No.: 10/073,904

(22) Filed: Feb. 14, 2002

(65) Prior Publication Data

US 2002/0117209 A1 Aug. 29, 2002

Related U.S. Application Data

(60) Provisional application No. 60/270,578, filed on Feb. 23, 2001.

(51) Int. Cl.[7] .............................................. F16K 27/00
(52) U.S. Cl. ...................................................... 137/269
(58) Field of Search ................................ 137/269, 271, 137/884

(56) References Cited

U.S. PATENT DOCUMENTS

| | | |
|---|---|---|
| 1,155,576 A | 10/1915 | Isley |
| 3,046,802 A | 7/1962 | Cupedo |
| 3,450,382 A | 6/1969 | Calim |
| 3,492,880 A | 2/1970 | Pearson |
| 4,293,117 A | 10/1981 | Mueller |
| 4,350,322 A | 9/1982 | Mueller |
| 4,436,280 A | 3/1984 | Geisow |
| 4,666,124 A | 5/1987 | Giacobbi |
| 4,898,203 A * | 2/1990 | Kobelt ........................ 137/269 |
| 4,961,538 A * | 10/1990 | Hewitt ........................ 239/728 |
| 5,005,805 A | 4/1991 | Morris et al. |
| 5,108,073 A | 4/1992 | Adachi |
| 6,007,047 A | 12/1999 | Phipps |
| 6,102,068 A * | 8/2000 | Higdon et al. ............... 137/341 |

FOREIGN PATENT DOCUMENTS

DE    2 062 871    7/1971

OTHER PUBLICATIONS

Belimo®, *Electronic Characterized Control Valves ½" to 2"*, Second edition (Jul. 1999) (1 pg.).
Delta Control Products®, Ball Valves, Electronic Ball Valve Technical Schematic, (p. 4) (1 pg.).

* cited by examiner

*Primary Examiner*—Kevin Lee
(74) *Attorney, Agent, or Firm*—Schlesinger, Arkwright & Garvey LLP

(57) ABSTRACT

Universal valve mounting device for mounting a variety of valve actuators to a variety of valves is disclosed. The universal valve mounting device includes a mounting plate and a valve actuator fastener provided on the mounting plate. A valve mounting fastener is likewise provided on the mounting plate, and the mounting plate is configured for securing a variety of valves to a respective variety of valve actuators each having a variety of valve mounting plate fasteners locations. The mounting plate may include a bend configured for creating a thermal break for providing air flow between an actuator mounted to the mounting plate and the mounting plate. A slot may likewise be provided on the mounting plate that is of sufficient size and length to accommodate various sizes and spacing of fasteners for securing a mounting plate to a variety of valve actuators, in use. The bend may include a leg.

16 Claims, 2 Drawing Sheets

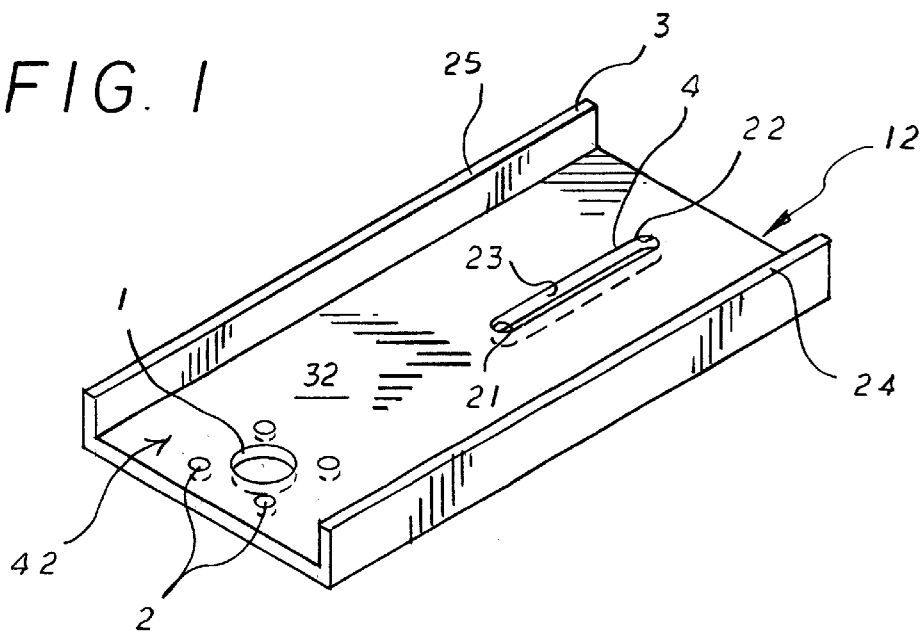
FIG. 1
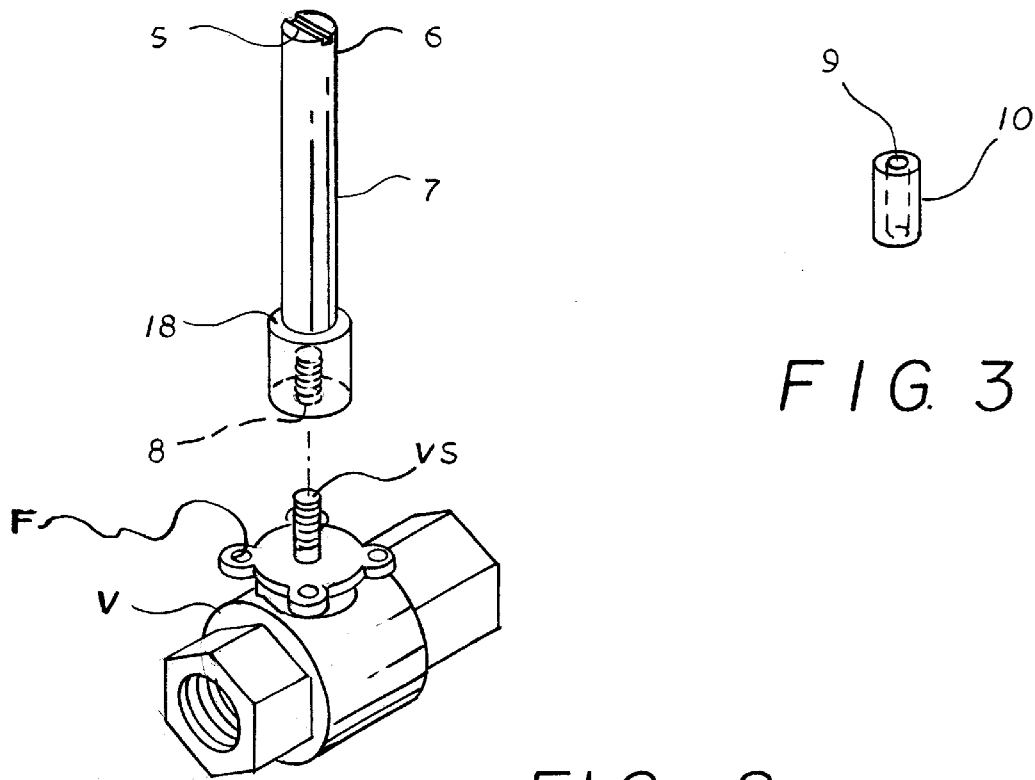
FIG. 3
FIG. 2

UNIVERSAL MOUNTING DEVICE FOR VALVES

CROSS REFERENCES TO RELATED APPLICATIONS

This application claims the priority of U.S. application Ser. No. 60/270,578, filed Feb. 23, 2001, which is incorporated herein by reference.

FIELD OF THE INVENTION

The invention relates to mounting devices. More particularly, the invention relates to mounting devices for valves. Even more particularly, the invention relates to universal mounting devices for automatic control valves of the type used in the heating, ventilation, and air conditioning (HVAC) industry.

BACKGROUND OF THE INVENTION

Mounting devices are known.

However, known valve mounting devices are suited for only a single type of valve. Thus, the user must be able to obtain the correct, particular mounting device in order to mount his or her valves in the desired location with the particular valve at hand. If the particular required valve mounting device is unavailable, costly delays occur.

In addition, known valve mounting devices tend to break, especially known mounting devices made of plastic.

Another drawback of prior art valve mounting devices is that there is undesirable heat transfer between the valve actuator and the valve.

Still further, prior art valve mounting devices, such as prior art mounting plates, have the actuator resting directly on mounting bolt heads. Such resting on bolt heads leads to misalignment problems between the prior art actuator and the valve secured thereto by the prior art mounting devices.

OBJECTS AND SUMMARY OF THE INVENTION

An object of the invention is to provide a valve mounting device that overcomes the drawbacks of prior art device.

A further object of the invention is to provide a valve mounting device that provides air flow between the mounting plate of the mounting device and the valve actuator, to reduce heat transfer between the valve actuator and valve mounted together by the valve mounting device.

Yet another object of the invention is to eliminate misalignment problems with prior art valve mounting devices, such as prior art valve mounting devices in which the known valve actuator is essentially resting directly on a mounting plate, for example.

In summary, the universal valve mounting device according to the invention overcomes the drawbacks of the prior art devices by providing a universal configuration that accommodates the mounting of a variety of valves to a valve actuator.

Still further, the invention reduces undesirable heat transfer by providing air flow between a valve actuator and the valve mounted thereto for reducing heat transfer therefrom.

The inventive valve mounting device eliminates misalignment of the actuator relative to the valve when the valve actuator and valve are connected together by the inventive mounting device.

BRIEF DESCRIPTION OF THE DRAWINGS

FIG. 1 is a perspective view of a valve mounting plate according to the invention;

FIG. 2 is a perspective view of an adaptor according to the invention positioned above a valve;

FIG. 3 is a perspective view of a spacer according to the invention, used such as shown in FIG. 4.

Figure 4:
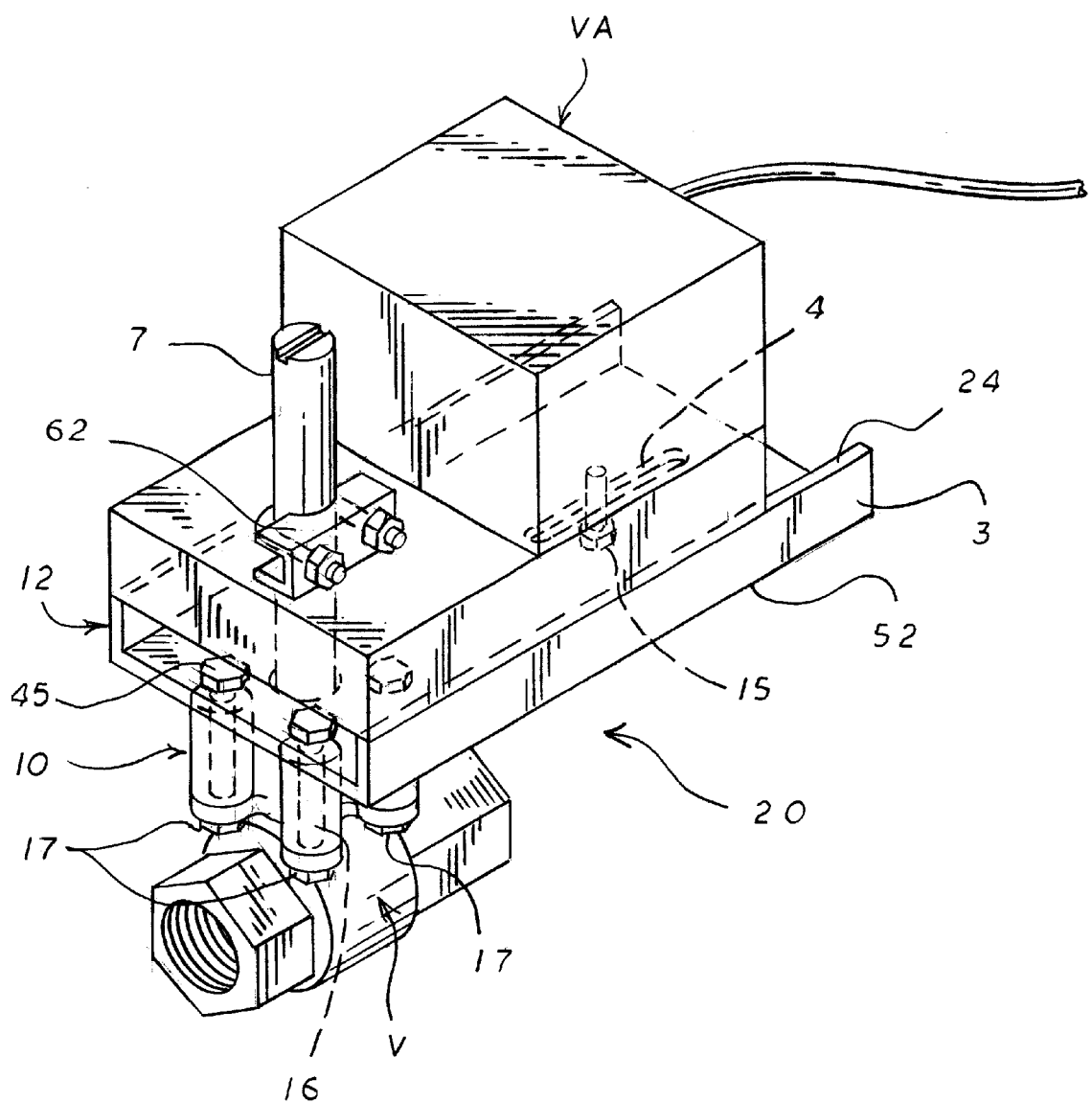
FIG. 4 is a perspective view of a valve 13 mounted to an actuator 11 by use of the universal valve mounting device 20 according to the invention.

It will be appreciated that relative terms such as up, down, left, and right are for convenience only and are not intended to be limiting.

DETAILED DESCRIPTION OF THE INVENTION

FIGS. 1–4 illustrate components used with a valve mounting device 20 according to the invention.

In FIG. 4, universal valve mounting device 20 is shown connecting a valve actuator VA to a valve V, such as a ball valve or other type of valve. The valve actuator may be of the type shown and described in U.S. Pat. No. 6,007,047 to Phipps, which is incorporated herein by reference. Please see the Phipps '047, actuator or drive motor 6, which is incorporated herein by reference. The Phipps '047 actuator or drive motor 6 is merely an example of the type of valve actuator VA shown herein that may be attached to valve V.

More specifically, as viewed from above in FIG. 1, a clearance hole 1 for an adaptor, such as a stem adaptor 7, is provided in a mounting plate 12. Clearance hole 1 also serve as a retaining hole, as shown, so that stem adaptor 7 can not be removed; i.e., adaptor 7 can not fall through hole 1 regardless of the orientation of the valve.

A number of valve fasteners or mounting holes 2, such as the illustrated four (4) holes may be provided in plate 12 so that bolt 16 can secure valve mounting device 20 when connecting valve V to actuator VA. Valve fasteners 2 may be male or female fasteners, as required.

A slot 4 may be provided in plate 12.

Slot 4 may be elongated so as to accommodate different lengths and sizes of actuators VA. Slot 4 may have a left end 21, a right end 22, and an infinite number of intermediate positions 23. Slot 4 also functions as an anti-rotation slot; i.e., valve actuator 11 is prevented from rotating relative to valve mounting device 20.

One or more upright bends or legs 3 may be provided on plate 12.

Bends 3 not only provide for clearance for bolt heads, but bends 3 create a thermal break by providing air flow between valve actuator VA and mounting plate 12. Such is achieved by configuring arms 3 so that free ends 24 and 25 are located and spaced relative to an upper face 32 of mounting plate 12 so as to define an air space 42 therebetween.

A position indicator 5 is shown on stem adaptor 7. Indicator 5 indicates how much valve V is open, for example.

A connector 8 is provided that slides over or is threaded to a valve shaft of valve V for connecting such to valve actuator A.

Valve V may have one or more mounting fasteners F that mate with fasteners 16 for securing valve V to mounting plate 12. Fasteners F may be male or female fasteners, as required.

A through hole 9 is provided in a spacer 10. Hole 9 receives one of bolts 16 therethrough. As discussed above, spacers 10 provide for even spacing so that there is no misalignment between valve actuator VA and valve V.

Bolts 16 may have heads 45 which extend into space 42, when universal valve mounting device 20 is in use.

One or more bolts 15 are used to secure actuator 11 at the right end thereof as viewed in FIG. 4. Bolt 15 extends through slot 4 when connecting actuator 11 to plate 12 of universal mounting device 20.

A shoulder 18 on adaptor 7 may be made sufficiently large so as to ensure that adaptor 7 can not fall through hole 1; i.e., shoulder 18 should be larger in diameter than the diameter of the illustrated circular hole 1.

In use, plate 12 is placed against valve V, as shown in FIG. 4. One or more bolts 16 are then inserted into and through respective mounting holes 2.

Respective spacers 10 are used and bolts 16 are passed through holes in spacers 10.

Stem adaptor 7 may then be inserted through its corresponding through hole 1.

Shoulder 18 of stem adaptor 7 will typically rest on or abut against a lower face 52 of plate 12. Valve V may then be abutted against spacers 10, as shown in FIG. 4.

A respective nut 17 sized to mate with a male fastener or bolts 16 will then be used to secure valve V, plate 12, spacers 10 and bolts 16 together, for example.

Once mounting plate 12 and valve V have been mounted together, valve actuator VA may conveniently be attached to mounting plate 12 of universal mounting device 20.

For example, valve actuator VA may be mated with adaptor 7, as shown in FIG. 4, and secured to universal mounting plate 12 by bolt 15 extending through slot 4.

Thanks to the configuration of slot 4, bolt or secure 15 may be moved anywhere from one end 21 to the other end 22 of slot 4. In that manner, bolt 15 may be located at an infinite number or positions 23 by which bolt 15 may be secured to valve actuator VA anywhere along the length of slot 4, as will be readily appreciated.

Thus, it may be considered that valve actuator VA is secured to mounting plate 12 at its right side, as viewed in FIG. 4, by bolt 15. Likewise, at the left side of actuator VA, as viewed in FIG. 4, valve actuator VA may be secured to mounting plate 12, for example, and to valve V by use of a fastener 62 attached to stem adaptor 7, as shown in FIG. 4. Fastener 62 may be a U-bolt, for example.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A universal valve mounting device for mounting a variety of valve actuators to a variety of valves, comprising:
    a) a mounting plate;
    b) a valve actuator fastener provided on said mounting plate;
    c) a valve mounting fastener provided on said mounting plate; and
    d) the mounting plate being configured for securing a variety of a valves to a respective variety of valve actuators and each having a variety of valve mounting plate fastener locations.

2. A universal valve mounting device as in claim 1, wherein:
    a) the mounting plate includes a bend configured for creating a thermal break by providing air flow between an actuator mounted to the mounting plate and the mounting plate.

3. A universal valve mounting device as in claim 2, wherein:
    a) a slot is provided on the mounting plate, the slot being of a sufficient size and length to accommodate various sizes and spacings of fasteners for securing the mounting plate to a variety of valve actuators, in use.

4. A universal valve mounting device as in claim 3, wherein:
    a) a spacer is provided, the spacer being configured for being disposed between the mounting plate and a valve secured thereto, in use.

5. A universal valve mounting device as in claim 1, wherein:
    a) a slot is provided on the mounting plate, the slot being of a sufficient size and length to accommodate various sizes and spacings of fasteners for securing the mounting plate to a variety of valve actuators, in use.

6. A universal valve mounting device as in claim 5, wherein:
    a) a spacer is provided, the spacer being configured for being between the mounting plate and a valve secured thereto, and to ensure even spacing therebetween, in use.

7. A universal valve mounting device as in claim 2, wherein:
    a) the bend includes a leg.

8. A universal valve mounting device as in claim 7, wherein:
    a) the mounting plate includes a lower face; and
    b) the leg extends transversely away from the lower face.

9. A universal valve mounting device as in claim 8, wherein:
    a) a further leg extends away from the lower face.

10. A universal valve mounting device as in claim 1, wherein:
    a) the valve actuator fastener is a female fastener.

11. A universal valve mounting device, comprising:
    a) a mounting plate having a valve fastener, the mounting plate being configured and sized for securing a valve to a variety of valve actuators having at least two mounting plate fastener locations;
    b) the mounting plate including a bend configured for creating a thermal break by providing a space conducive to air flow between a valve actuator mounted to the mounting plate and the mounting plate, in use;
    c) a slot being provided on the mounting plate, the slot being of a sufficient size and length to accommodate various sizes and spacings of fasteners for securing the mounting plate to a variety of valve actuators, in use;
    d) the slot being provided on the mounting plate and spaced apart from the valve fastener; and
    e) the mounting plate including a valve fastener for securing a valve thereto, the valve fastener and the slot being configured and located for securing a variety of valves to a respective valve actuator by each being concurrently mounted to the mounting plate.

12. A universal valve mounting device as in claim 11, wherein:
  a) the bend includes a leg sufficiently long so that, in use, when a valve actuator is mounted on the valve mounting plate and a valve is mounted on the valve mounting plate, a bolt head of a mounting fastener which mounts a valve to the valve mounting plate is sufficiently free of contact from a valve actuator mounted on the valve mounting plate so as to prevent misalignment between a valve actuator and a valve mounted thereto.

13. A universal valve mounting device as in claim 11, wherein:
  a) the bend includes a leg.

14. A universal valve mounting device as in claim 13, wherein:
  a) the mounting plate includes a lower face; and
  b) the leg extends transversely away from the lower face.

15. A universal valve mounting device as in claim 14, wherein:
  a) a further leg extends away from the lower face.

16. A universal valve mounting device as in claim 11, wherein:
  a) the valve actuator fastener is a female fastener.

* * * * *